United States Patent [19]

Chang

[11] Patent Number: 5,748,329
[45] Date of Patent: May 5, 1998

[54] METHOD AND APPARATUS FOR ADAPTIVE COLOR SCANNING/PRINTING DATA CORRECTION EMPLOYING NEURAL NETWORKS

[75] Inventor: Gao-Wei Chang, Tainan, Taiwan

[73] Assignee: Industrial Technology Research Institute, Hsinchu, Taiwan

[21] Appl. No.: 612,574

[22] Filed: Mar. 8, 1996

[51] Int. Cl.$^6$ .............................. H04N 1/40; H04N 1/46; G03F 3/08; G03F 15/18

[52] U.S. Cl. .................. 358/298; 358/504; 358/518; 395/21

[58] Field of Search ................................. 358/298, 501, 358/504, 518, 520, 530, 534; 382/162, 167; 395/21–24

[56] References Cited

U.S. PATENT DOCUMENTS

| | | | |
|---|---|---|---|
| 5,162,899 | 11/1992 | Naka et al. | 358/518 |
| 5,200,816 | 4/1993 | Rose | 358/518 |
| 5,506,696 | 4/1996 | Nakano | 358/504 |

OTHER PUBLICATIONS

D.E. Rumelhart, et al. "Learning Internal Representations by Error Propagation", Chapter 8 of *Parallel Distributed Processing*..., Sixth Printing, 1987.

H.R. Kang & P.G. Anderson, "Neural network applications to the color scanner and printer calibrations" from Journal of Electronic Imaging 1(2) Apr. 1992, pp. 125–135.

B. Petschik, "Color Hard Copy—a self–tuning color correction algorithm based on . . . ", SPIE vol. 1458 Printing Technologies for Images, Gray scale, and Color 1991, pp. 108–114.

G. Starkweather, "A Color–Correction Scheme for Color Electronic Printers", Xerox Palo Alto Research Center; vol. 11, Supplement 1986, pp. S67–S72.

*Primary Examiner*—Eric Frahm
*Attorney, Agent, or Firm*—Ladas & Parry

[57] ABSTRACT

A method and apparatus for adaptive color scanning/printing data correction to effectively adjust to an arbitrary combination of color image scanning input and printing output devices for reproducing color image at optimized resemblance. An improved back propagation algorithm is employed to reduce the learning error and accelerate the process of learning procedure by increasing the rate of convergence. A method of characteristics extracting functionalization is utilized to urge the successful convergence of the learning procedure of the neural network, and reduce the color discrepancy and accelerate the process of learning convergence. An enhanced grey-scale balancing scheme is also utilized to extract the grey component of a learning sample under a predetermined condition and re fetch again to the neural network for accelerated convergence of the learning behavior. An apparatus for performing the color data correction includes an integrated neural network color processor that utilizes a small number of neural elements to reduce the complexity of the color data processing and computational complication.

17 Claims, 13 Drawing Sheets

METHOD AND APPARATUS FOR ADAPTIVE COLOR SCANNING/PRINTING DATA CORRECTION EMPLOYING NEURAL NETWORKS

BACKGROUND OF THE INVENTION

1. Field of the Invention

The present invention relates in general to a method and apparatus for color correction of image scanning and printing devices. In particular, the present invention relates to a method and apparatus for color data processing of image scanning and printing by neural network techniques. More particularly, the present invention relates to a method and apparatus for neural network processing of color data for image scanning and printing employing arbitrary combination of color scanning input and printing output apparatuses.

2. Technical Background

As the techniques of non-impact printing processes and printing engines advance, the problems of capturing the characteristics of color images and processing the captured database through adaptive color-correction methods to obtain the closest reproduction of the original image, have become important issues in the field of color image reproduction.

Techniques of color image reproduction employing color image input scanning and color image output printing include color gamut mapping, halftoning techniques, four-color printing, and self-tuning color correction, etc. Conventional techniques of color correction for color image printing achieve limited color correction through the masking method with assumed mathematical modeling, whereby scanned primary color data values are converted into corrected color density values utilized for controlling the color printing. Two of the related techniques were disclosed by Petschik and Starkweather in 1986 and 1991 respectively.

Different color image printing processes exhibit significantly distinct characteristics of non-linearity in color data processing. The masking method for color image correction based on fixed mathematical modeling is therefore only suitable for specific scanning input and printing output devices. Application of the masking method based on fixed mathematical modeling is hardly suitable for arbitrary combinations of color scanning and printing devices to result in satisfactory color image reproduction. In view of the continued trend of cost/price reductions for color copying machines, color printers, color scanners, and color facsimile machines, etc., as well as the foreseeable popularity of these devices as a result of such cost/price reductions, the concept of the combination of arbitrarily selected color image scanning input and color printing output devices that can achieve high-fidelity color image reproduction has become an increasingly important idea.

Kang and Anderson had proposed in 1992 a so-called "quickprop (quick propagation)" neural network algorithm for reducing the color discrepancies between the characteristics of color scanning input and color printing output devices. Their method, however, must rely on laboratory-grade color measuring instruments to measure the color parameters of the color image being processed. It lacks the capability of self-tuning color correction.

Naka et al disclosed in the U.S. Pat. No. 5,162,899 "Color Data Correction Apparatus Utilizing Neural Network" issued on Nov. 10, 1992 a concept of "plant inverse scheme", employing neural network to perform the color correction for the image reproduction. The disclosure of Naka et al. however, had, not considered whether or not the training pattern of the neural network was able to be functionalized mathematically. In other words, no confirmation was made for whether the composite characteristics of the printing output device and the scanning input device were invertible or not. The quality of color image reproduction by their color correction method for the arbitrarily selected input and output devices is not satisfactory, there being occasions when the learning phase of the neural network never converged at all.

The disclosure of the present invention has therefore focused on the color-correction techniques of the arbitrary combination of any color image scanning input and printing output devices for satisfactory color image reproduction.

SUMMARY OF THE INVENTION

It is therefore an object of the present invention to provide a method and apparatus of the adaptive color correction for arbitrary combination of the color characteristics of scanning input and printing output devices, such that color images are reproduced with color qualities which closely resemble that of the originals.

It is another object of the present invention to provide a method and apparatus of adaptive color correction for image scanning and printing devices capable of improving the performance characteristics of the back-propagation algorithm utilized by conventional neural networks, such that the learning error is reduced and the rate of convergence of the learning behavior is improved.

It is still another object of the present invention to provide an integrated neural network color processor, comprising a lesser number of neural elements in the network to reduce the complexity of the computations involved in color data processing, so as to simplify the structural configuration of the color processor.

It is still another object of the present invention to provide a scheme for grey scale balancing in order to base the learning process for a successive learning on the result of a previous learning, thereby obtaining good balancing in the grey scale.

It yet again another object of the present invention to provide a method of characteristics-extraction for image scanning and minting devices, so as to reduce the color discrepancies in the reproduced image and to accelerate the process of convergence in the learning procedure.

BRIEF DESCRIPTION OF THE DRAWING

Other objects, features and advantages of the present invention will become apparent by the following detailed description of the preferred but non-limiting embodiments, with reference to the accompanied drawings, wherein.

DETAILED DESCRIPTION OF THE PREFERRED EMBODIMENT

I Characteristics-Extracting Functionalization

Characteristics-extracting functionalization refers to the extraction of the nonlinear composite characteristics of both the color image scanning input and printing output devices, which are to be employed for the reproduction of color images. For example, color scanners and color printers can be utilized as the scanning input and printing output devices respectively.

Based on the concept of neighborhood, the extraction of the composite characteristics of both the color scanning and printing devices can be performed by manipulating the color coordinates obtained from the rescan-in print-out of a self-test pattern with averaging method. The extent, or threshold, of the neighborhood can be determined based on the results of either calorimetric simulations or experiments. After processing the color sample points in both the scanned input and printed output color spaces by the same method, a set of learning samples for the neural network can be obtained, which inherit the characteristics of both the scanning input and printing output devices. The set of effective learning samples can make the neural network converge relatively faster in its learning process.

As a result, when the concept of plant inverse is employed by a neural network to perform the color data correction for reproducing the color image, it is frequently found that a mathematically functional relationship can not be established between the test input image, or, in some cases, the established mathematic function is much too complicated. Such complicated mathematical functions cause the learning processes of the neural network to slow in convergence, or even diverge at all. In some occasions, the learning error was much too fluctuating for a good convergence behavior.

Figure 6:
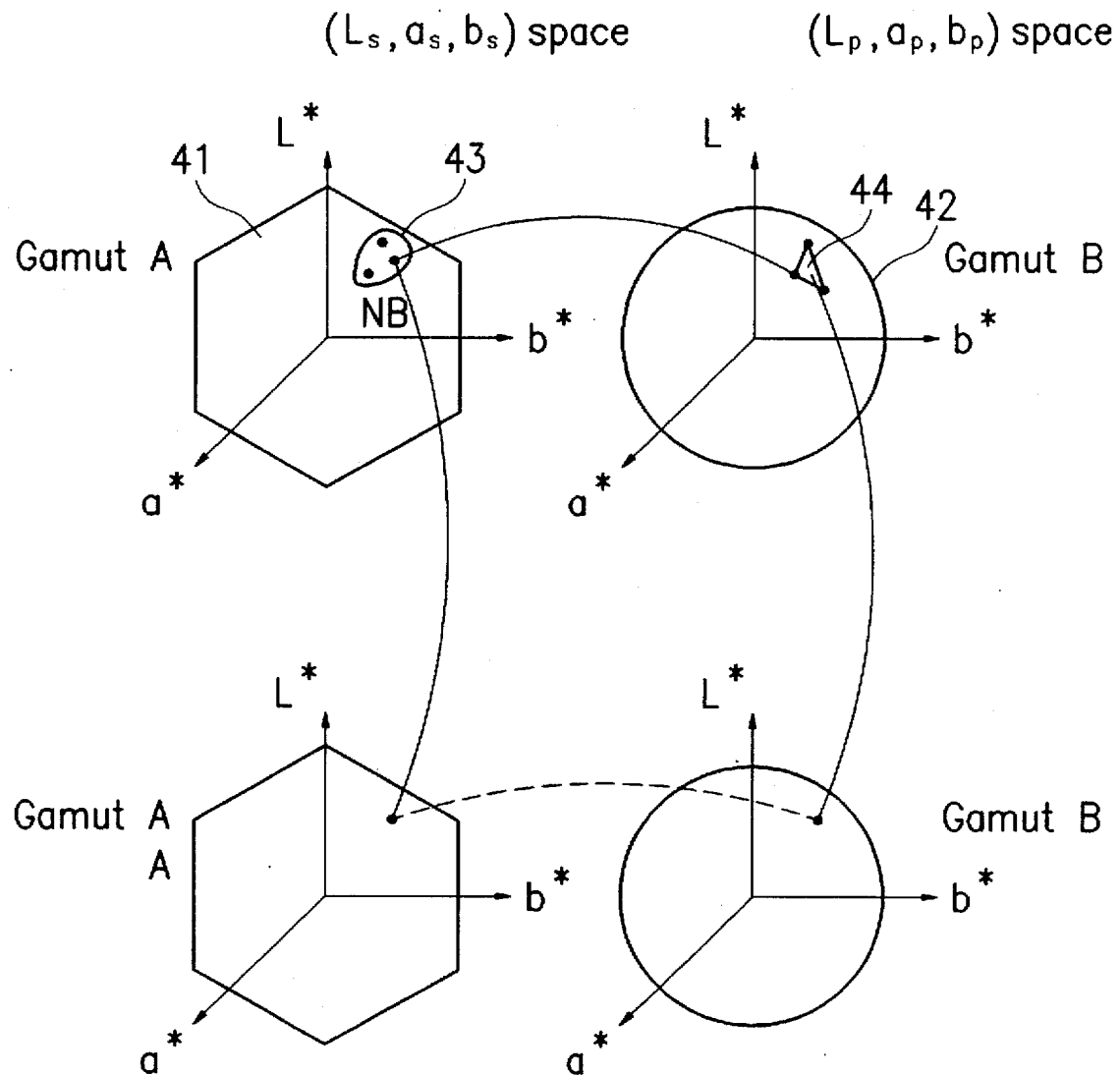
FIG. 6 shows three-dimensional color spaces for describing the characteristics-extracting functionalization in accordance with the preferred embodiment of the present invention.

The present invention provides a method for characteristics extracting functionalization which solves this problem of complicated mathematically functional relationship for the gamut mapping between the inputting and outputting devices. Referring to FIG. 6, in which three-dimensional color spaces for describing the characteristic extracting functionalization in accordance with the preferred embodiment of the present invention is shown. As shown in the figure, the A gamut 41 and B gamut 42 are gamuts for the input (i.e., scanning) picture elements ($L_s$, $a_s$, $b_s$) and output (i.e., printing) picture elements ($L_p$, $a_p$, $b_p$) respectively, wherein p=1, 2, . . . , N, and s equals p. Furthermore, N is the number of the selected self-test color image patterns. In addition, the neighborhood NB 43 is the neighborhood of one input picture element ($L_{s0}$, $a_{s0}$, $b_{s0}$), while region 44 is the corresponding region of the input picture element neighborhood NB 43 in the ($L_p$, $a_p$, $b_p$) space.

It is generally almost impossible, or at least difficult, to find a mathematical functional relationship between the input picture element color space ($L_s$, $a_s$, $b_s$) and the output picture element color space ($L_p$, $a_p$, $b_p$). The characteristics extracting functionalization in accordance with the preferred embodiment of the present invention seeks in the input color space ($L_s$, $a_s$, $b_s$) for space points that are in the neighborhood and are close to the vicinity enough. In other words, an X neighborhood is defined and sought to find if there was any space point within a constraint of a predefined threshold value. The range defined by the threshold value should not be too large. Considerations of human eye recognition to color must be taken into account to set the proper range of the threshold.

If there was any color space point in existence within the range of the input picture element color space, an average of the points in the range is taken. Another average is then taken correspondingly in the output picture element color space, among the points in the region 44 that corresponds to the neighborhood NB 43 of the input color space. Accordingly, characteristic sample pairs of the input and output picture elements can be established for the input and output color spaces. Namely, if $X_i=(L_{si}, a_{si}, b_{si})$ represents the points in the X neighborhood, where $X=(L_{s0}, a_{s0}, b_{s0})$ is the particular point in the input picture element color space, wherein i=1, 2, . . . , nb, then $$X = \frac{\sum_{i=1}^{nb} X_i}{nb}$$

and $$Y = \frac{\sum_{i=1}^{nb} Y_i}{nb}$$

wherein X and Y are in the input and output picture element color spaces respectively.

Similar establishment can be applied to all other points in the color spaces, so as to obtain a set of representative learning sample pairs $(X_k, Y_k)$ for the neural network, wherein k=1, 2, ..., K. This learning sample pair construction is referred to herein as "neighborhood approximation", which ensures that the pairs $(X_k, Y_k)$ are necessarily a set of all dissimilar points, therefore, there exists a mathematical function $$f: X_k \to Y_k$$

wherein k=1, 2, ..., K.

Thus, the gamut mismatch problem of the prior art technique in the learning sample construction can be solved by the present invention.

In a preferred embodiment of the characteristics extracting functionalization of the present invention, the controlling parameters for learning samples, that is, the value of the neighborhood in the CIE LAB space, should have their initial setting values, or, in other words, the measurement differences in the CIE LAB space, should be in the range of above $L_{th}=0.05$, $a_{th}=0.1$, $b_{th}=0.1$, and below $L_{th}=5$, $a_{th}=7$, $b_{th}=7$.

II Enhanced Grey-Scale Balancing

Secondly, the basic principle for neural network learning for the enhanced grey-scale balancing is the non-linear least square method, or, in other words, the stochastic approximation. The method of enhanced grey-scale balancing involves basically stopping the learning process when the system learning error is lower than a predetermined percentage. Then the grey scale parameters of the current sample is extracted, which are then fetched to the neural network to start again the learning process.

Figure 9:
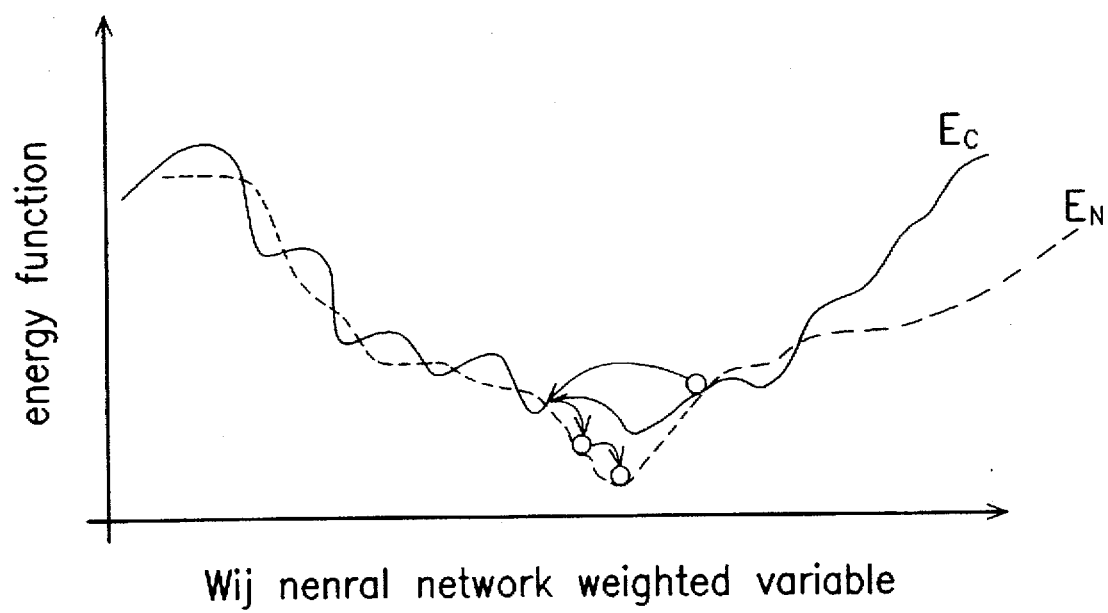
FIG. 9 shows, in view of the energy function of system error, the idea of the enhanced grey-scale balancing algorithm in accordance with the preferred embodiment of the present invention.

Referring to FIG. 9, there is shown the characteristic curve of the enhanced grey-scale balancing algorithm in accordance with the preferred embodiment of the present invention. Due to the fact that human eyes are more sensitive to the grey than to other colors, the present invention has made use of this fact to enforce the grey-scale balancing by stopping the learning process of the neural network applied on the sample pair $(X_k, Y_k)$ whenever the learning error in the process goes below a pre-defined threshold $E_c$, so as to extract the grey portion of the current sample and constitute a set of a neutral-colored learning sample.

The new learning sample is then fetched again to the neural network to continue the process of learning. Since the new sample is a subset of the $\{X_k, Y_k\}$ pair, the new learning errors E that result in the re-started learning process will be smaller than when the process was stopped. When the error reaches a pre-determined value (generally at 1.5%), the process of grey scale balancing can then be terminated, with acceptable result.

III Integrated Neural Network Color Processor

Next, the integrated neural network color processor comprises a small number of neural elements which performs a transformation from the RGB color space to the CIE LAB color space. On the other hand, the transformation in the reverse direction, that is, from the CIE LAB to the RGB space can also be performed utilizing the same integrated neural network color processor. The RGB can be of any internationally established standard such as NTSC, PAL, etc., since all the point sets in the conventional device-dependent RGB color space can all be subsets of the RGB standards mentioned above.

Figure 11A:
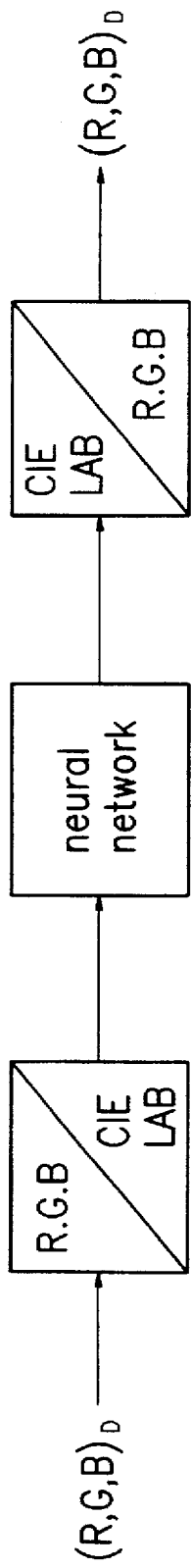
FIGS. 11a and 11b show the conventional neural network employing look-up table interpolation for color space transformation and an integrated neural network color processor of the present invention respectively.
Figure 11B:
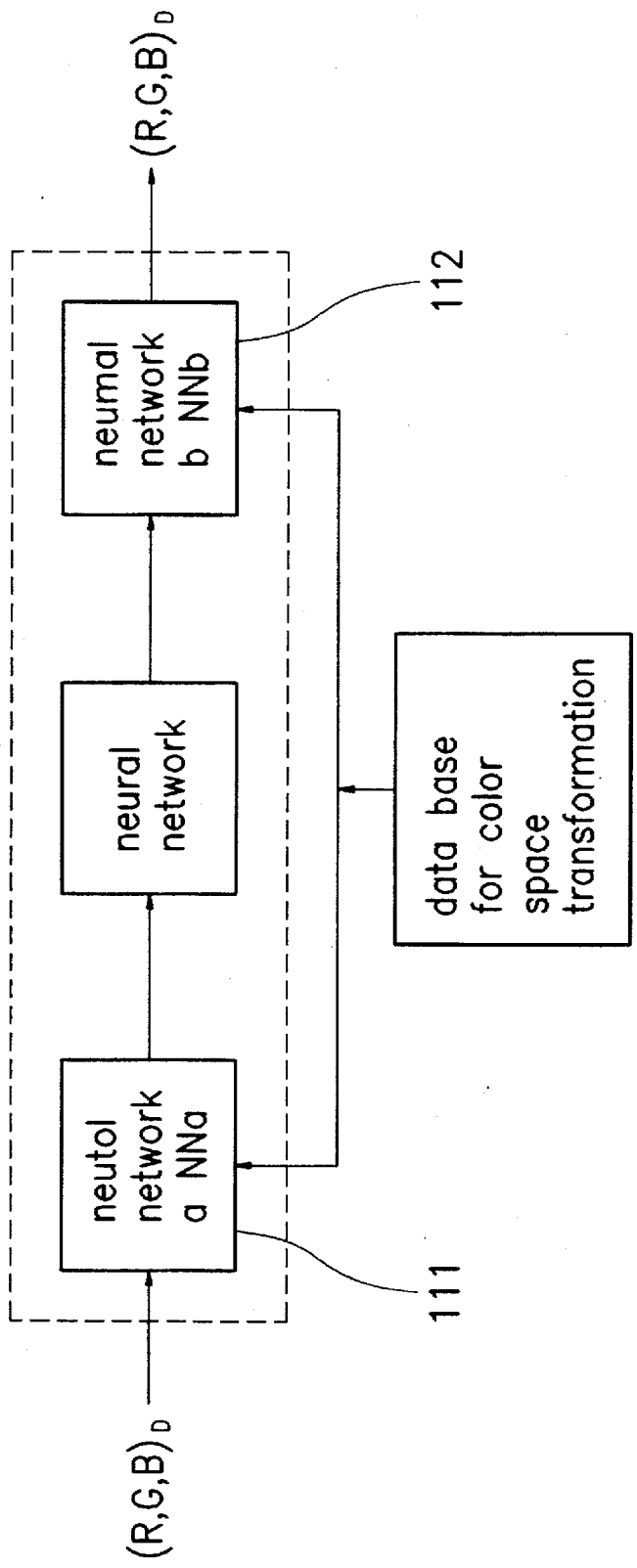

Referring to FIG. 11a, there is shown a system incorporating conventional look-up table (LUT) for performing the interpolating color space transformation. Such a conventional method of LUT interpolation requires a complicated computational procedure. With the addition of two integrated neural networks NNa 111 and NNb 112 in accordance with the present invention, as shown in FIG. 11b, the color processor can be responsible for the transformation of RGB to CIE LAB and the reverse respectively.

Such a system can reduce both the error and computational complication involved in the RGB/CIE LAB transformations, and, meanwhile, the hardware configuration of the integrated neural network color processor can also be simplified.

IV Improved Back-Propagation Learning Algorithm

To process the data in the CIE LAB color space rapidly, the conventional method of back-propagation learning algorithm, which is slower in learning behavior, must be improved based on the following:

For the output layer k, $$\Delta W_{kj} = \eta \cdot \delta_k \cdot O_j$$

$$\delta k = (t_k - O_k)(1 + O_k)(1 - O_k)$$

and for the inner layer j, $$\Delta W_{ji} = \eta \cdot \delta j \cdot O_i$$

$$\delta j = \left( \sum_k \delta_k W_{kj} \right)(1 - O_j) \cdot O_j \cdot hp$$

The improved back-propagation algorithm modified the back-propagation algorithm proposed by Rigler in 1991, with the primary correction to the $\delta_k$ item. The original $\delta_k$ was:

$$\delta_k = (t_k - O_k)(1 + O_k) \cdot O_k$$

and the improvement is:

$$\delta_k = (t_k - O_k)(1 + O_k)(1 - O_k)$$

Such correction allows for the processing of any positive or negative function value, that is, to be able to process the data in the full CIE LAB space.

In the above equations, the $O_i$, $O_j$, and $O_k$ items are the outputs of the neural elements in the i, j and k layers of the neural network respectively. $t_k$, on the other hand, is the target value of the output layer neural element. $h_p$ is the inner layer acceleration parameter, and the $W_{kj}$ and $W_{ji}$ are the neural weight values between the k and j layers and between the j and i layers respectively. Finally, is the learning rate parameter.

In a preferred embodiment of the improved back-propagation algorithm of the present invention, the inner layer acceleration parameter $h_p$ should be in the range of 1.1 to 8, and the learning rate parameter should be in the range of 0.0005 to 0.9.

Figure 7:
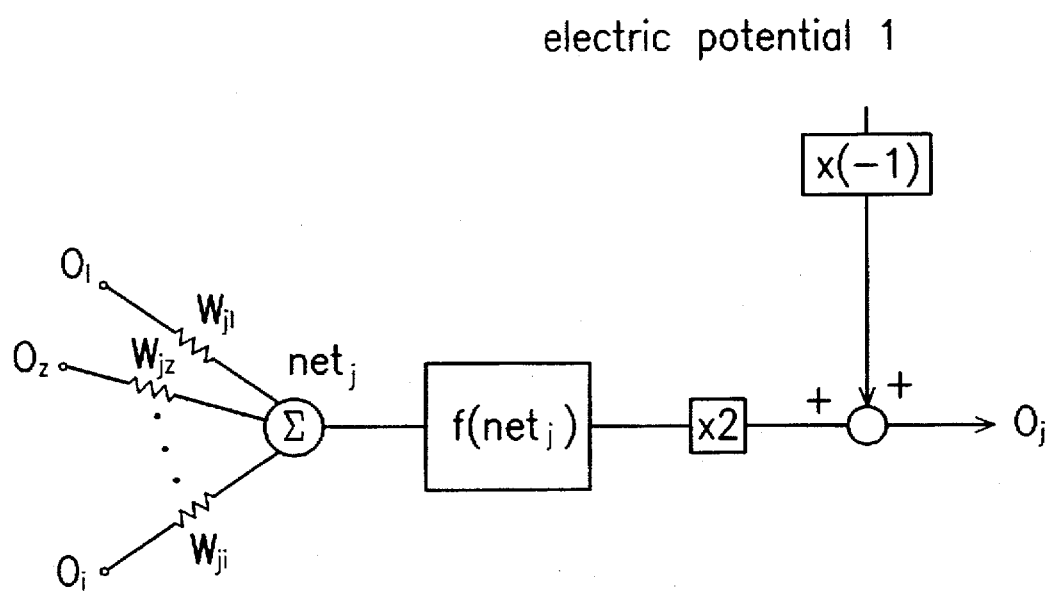
FIG. 7 shows the structural configuration of a neural element in the improved neural network in accordance with the preferred embodiment of the present Invention.

As can be seen in FIG. 7, in the structural configuration of an improved output neural element, since $$net_j = \sum_{i=1}^{i} W_{ji} \cdot O_i$$

therefore, $$O_j = 2f(net_j) - 1$$

wherein $$f(net_j) = \frac{1}{1+\exp[-(net_j - \Theta_K)/\Theta_0]}$$

wherein the $\Theta_k$ and $\Theta_0$ are set threshold parameters, and the neural element in all other layers are the same as that of the conventional technique.

The improved back-propagation learning algorithm, together with the output neural element having specific structural configuration of the present invention, is suitable for performing color data correction operations in the uniform color space. The neural network comprising the neural element of the present invention should be able to coupe with the general mathematic functional behaviors, that is, the dependent and independent variables must all be extending in a range of the full positive to negative values. Therefore, as is shown in FIG. 5, in which the structure of an improved neural network in accordance with a preferred embodiment of the present invention is shown, the neural network can be employed to perform the above described learning algorithm.

Figure 5:
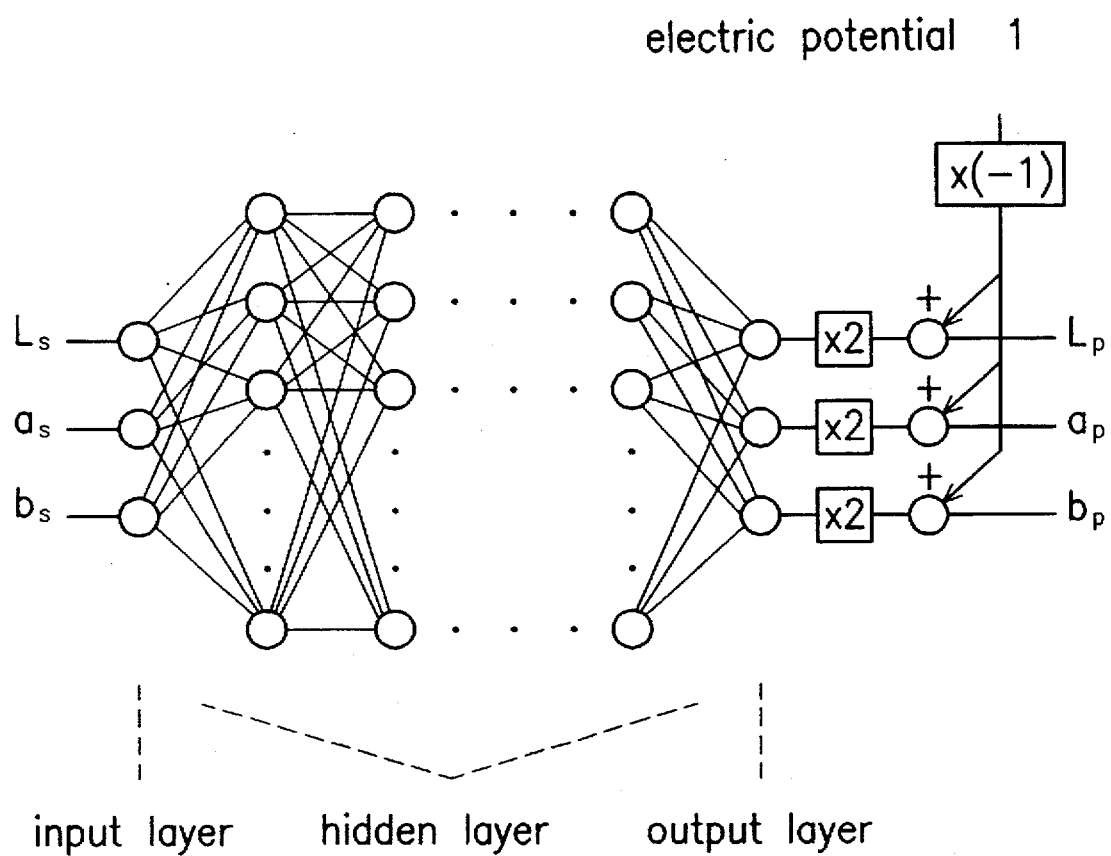
FIG. 5 shows the structural configuration of an improved neural network in accordance with a preferred embodiment of the present invention.
Figure 8A:
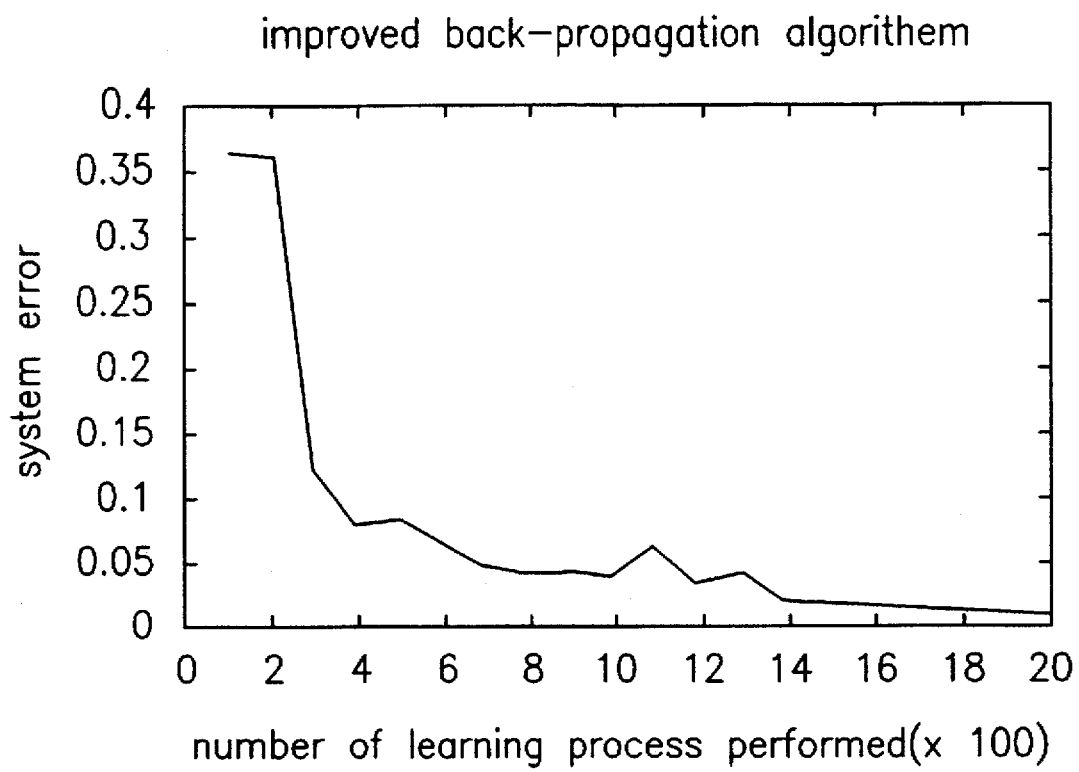
FIG. 8a and 8b show the performance curves of the improved back-propagation algorithm and enhanced grey-scale balancing algorithm respectively, representing the convergence behavior of the learning process performed by the improved neural network of FIG. 5 in accordance with the present invention.
Figure 8B:
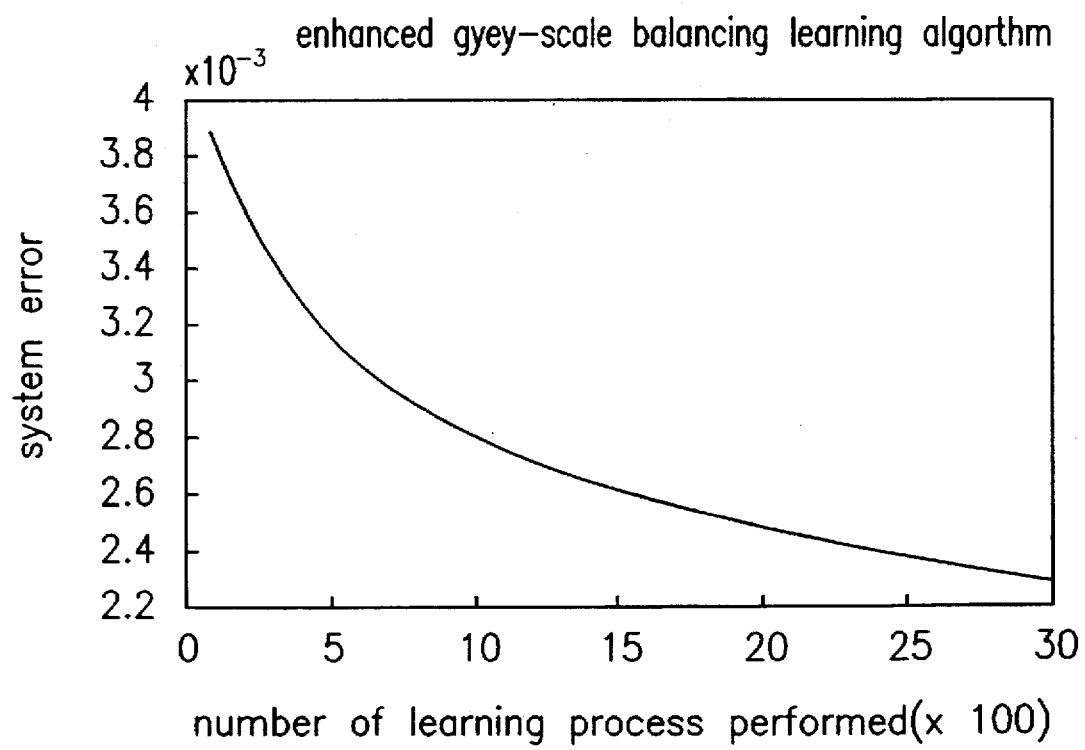

The neural network of FIG. 5 is structurally a multi-layer network, comprising between three and 12 individual layers. Each individual layer should comprise 20 to 500 neural elements. As shown in FIG. 8a, which depicts the characteristic curve of the learning behavior of the neural network of FIG. 5, and in FIG. 8b, which depicts the characteristic curve of the learning behavior of the enhanced grey-scale learning algorithm, it is demonstrated that the fast convergence allows the learning process to proceed at faster speed.

V The Algorithm in Flow Chart

Figure 1A:
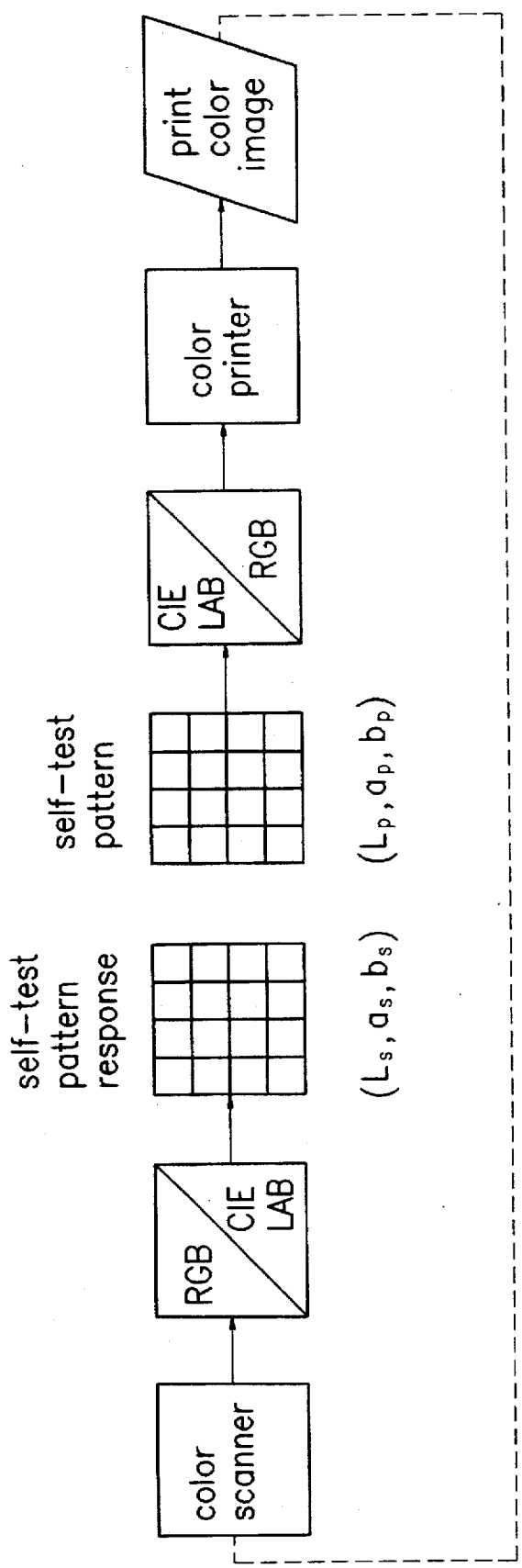
FIGS. 1a and 1b show, in block diagrams respectively, a plant inverse scheme and a neural network employed by the prior art to implement the color data correction for color image reproduction.
Figure 1B:
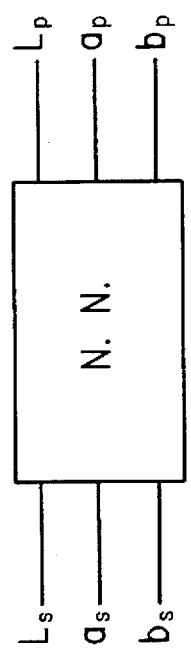
Figure 2:
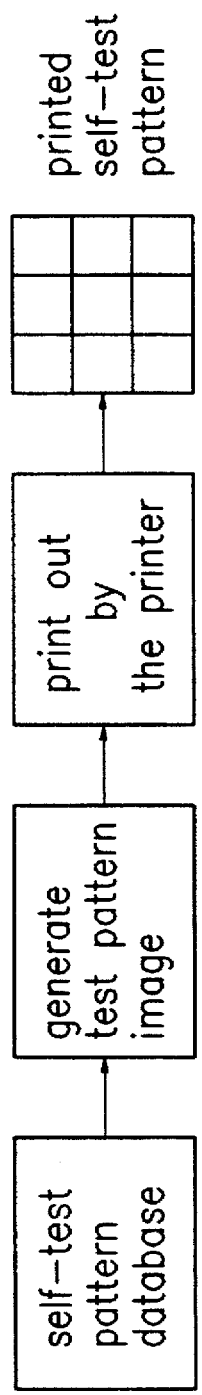
FIG. 2 schematically shows the procedure of printing the self-test patterns, by a color image printing output device, for implementing printer characteristics excitation as outlined in the flow chart of FIG. 13.
Figure 13:
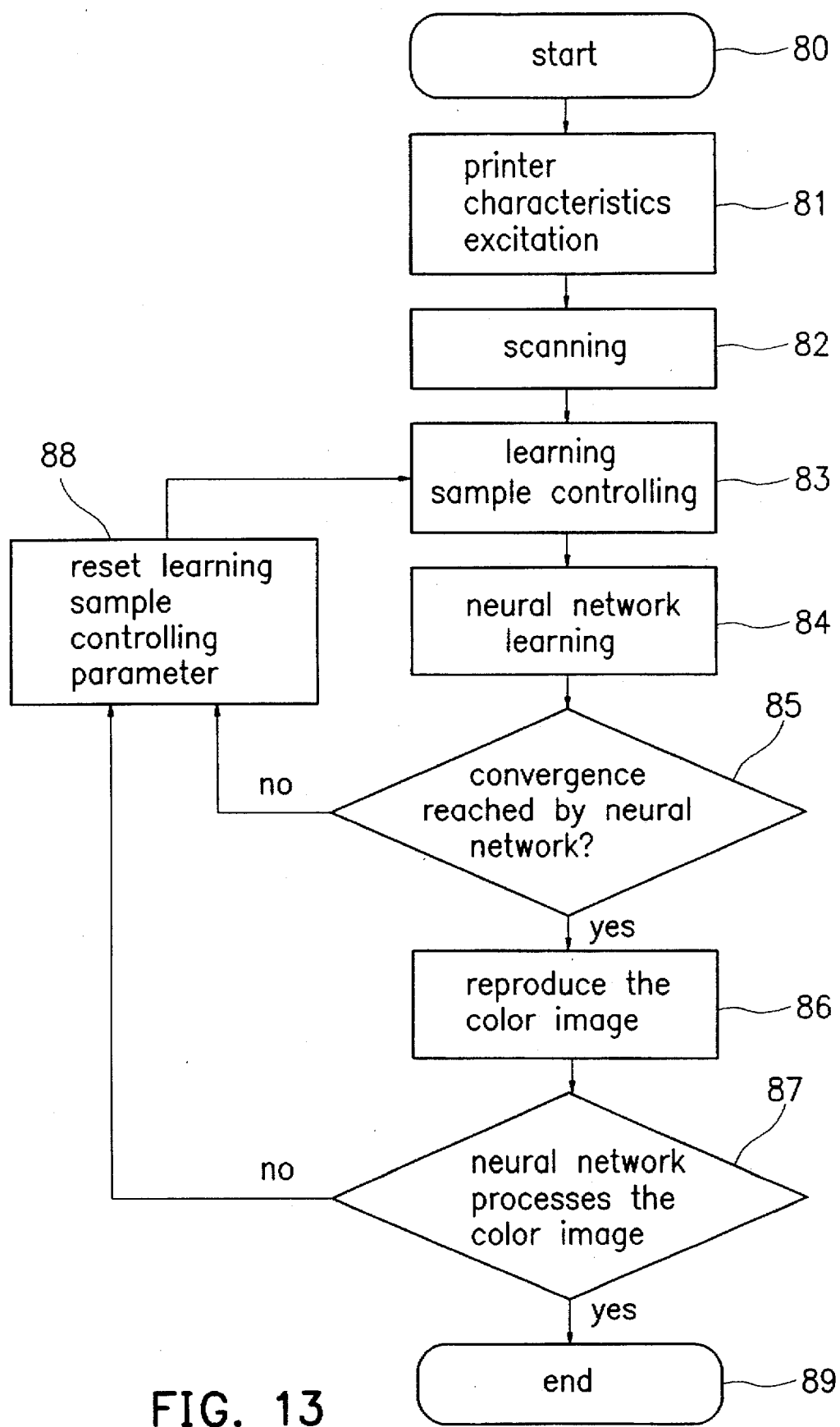
FIG. 13 shows the flow diagram of a color correction procedural algorithm in accordance with a preferred embodiment of the present invention.

The description that follows takes an example of a flow chart that the neural network color correction procedure of a preferred embodiment of the present invention follows to perform the color correction required for color image reproduction. As shown in FIG. 13, the procedure starts at step 80. The neural network performs an operation of characteristics excitation against the printing output device at step 81. The printing output device in this embodiment can be a color printer, and several self-test color image patterns are sent to the color printer for test printing. As shown in FIG. 2, the color printer device is test-printed by fetched sets of self-test image pattern data that constitutes the test patterns actually printed by the color printer device.

Figure 3:
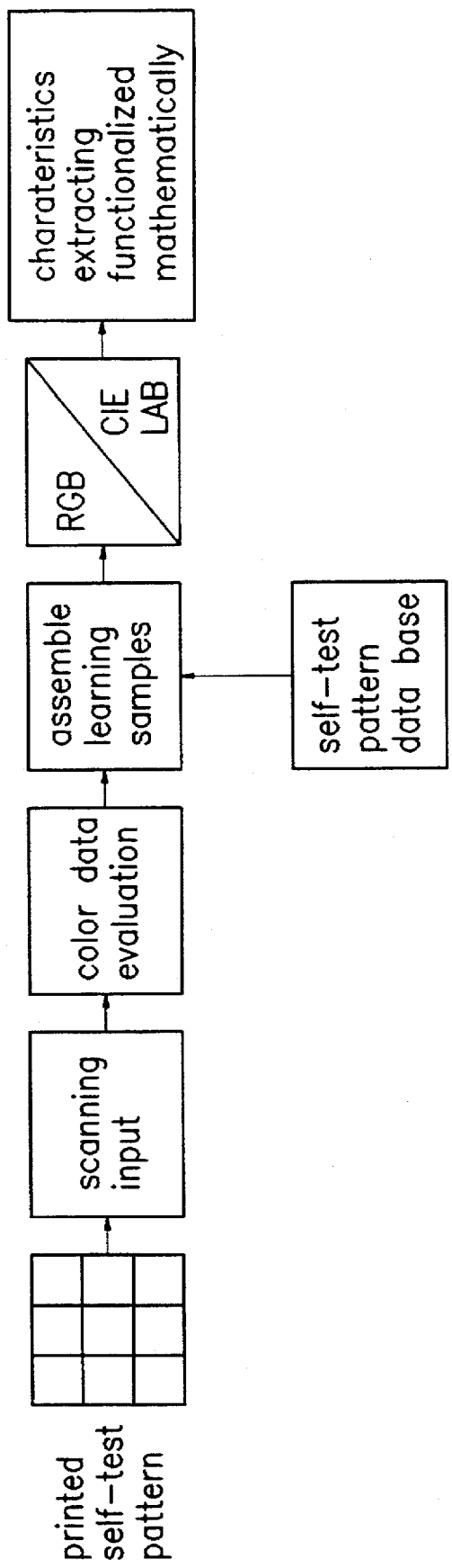
FIG. 3 schematically shows, in accordance with a preferred embodiment of the present invention also outlined in the flow chart of FIG. 13, the procedure of scanning the self-test patterns by a color image scanning input device, computing the color data, assembling the learning sample, making the color space transformation, and functionalizing mathematically the characteristics of the evaluated color data.

Next, at step 82, the self-test image patterns printed by the color printer device in step 81 are provided to the scanning input device, a color scanner in this embodiment, for subsequent scan-sampling. Each pattern is scanned and its corresponding color characteristic data are computed. In FIG. 3, the procedural block flow diagram shows that a neural network color correction procedure provides the self-test image patterns outputted by the printing output device to the input scanning device for subsequent scanning. The scanned image patterns are then analyzed for color characteristic information, which is then merged with the data contained in the self-test color data to build the learning sample for the neural network. In other words, the color data of the input image picture elements in the input color space are combined with the color data of the output image picture elements in the output color space, so as to establish the learning sample points for the neural network. The RGB to CIE LAB color space transformation is performed to implement the control of the learning samples for the neural network.

Figure 4:
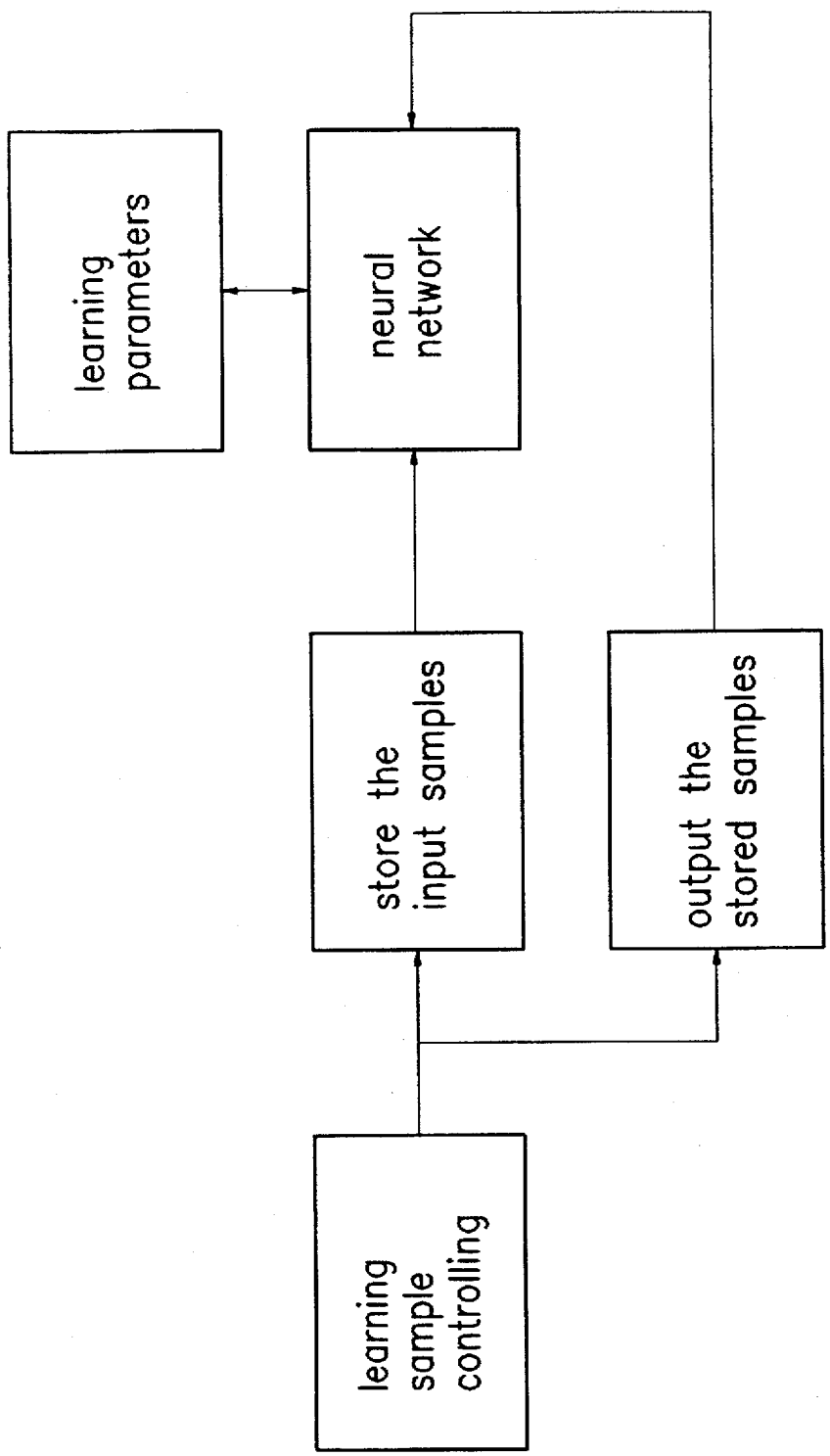
FIG. 4 schematically shows the flow diagram of the neural network performing, in accordance with a preferred embodiment of the present invention outlined in FIG. 13, the learning procedure based on the learning samples generated by the process of characteristics-extracting functionalization.

Then, subsequently in step 83, the characteristics extracting functionalization procedure is then performed to obtain a new set of self-test image pattern. The new set of self-test image pattern is then utilized in the learning process carried out in step 84. FIG. 4 is a schematic diagram showing the neural network of the present invention carrying out the color correction procedure to obtain a new set of learning sample for the neural network.

Next, in the decision-making step 85, the algorithm determines whether or not the learning procedure performed by the neural network is converging. If the process converged to within a predetermined threshold, the algorithm proceeds to step 86. If not, then step 88 is taken to reset the learning sample parameters before returning to step 83 for renewed learning process based on new set of learning sample.

Each time the decision step 85 determines that the learning process is not converging, the self-test image pattern parameters are reset by an incremental value, that is, for example, the increments of $L_{th}$=0.25, $a_{th}$=0.25, and $b_{th}$=0.25, respectively. The increment of the parameters are continued until the learning process converges. Due to the fact that the parameter values $L_{th}$, $a_{th}$, and $b_{th}$ are subsequently increased in value in each reset, the new learning sample would become simplified after the new learning sample is functionalized. The learning process performed by the neural network becomes more tending to converge, with a result that the decision step 85 will be reaching a positive result after the parameters are reset to certain value.

Figure 10:
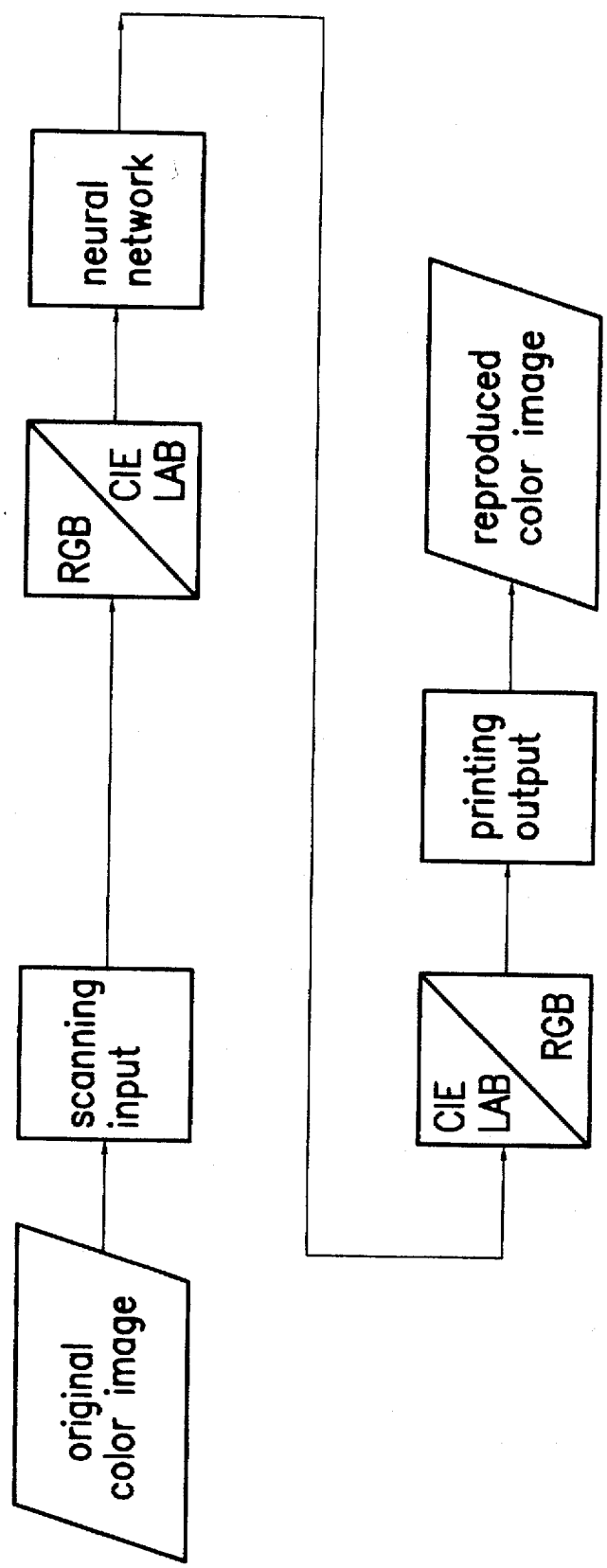
FIG. 10 shows a neural network employed in a color data correction procedure in accordance with a preferred embodiment of the present invention for the reproduction of color images.
Figure 12:
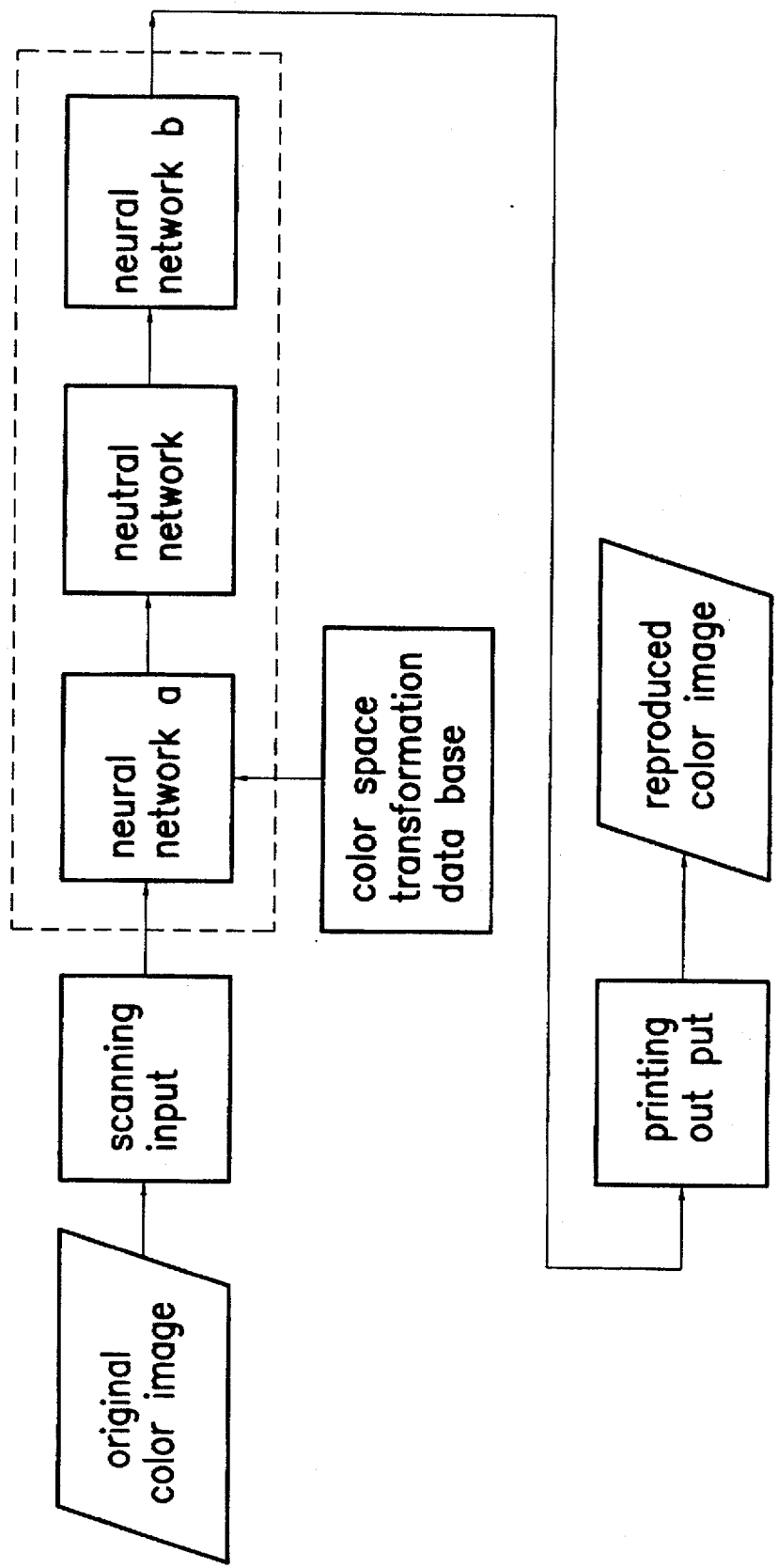
FIG. 12 shows the color reproduction system employing the integrated neural network color processor of FIG. 11.

Thus, once the decision-making step 85 reaches a positive, that is, converging result, the process advances to step 86, where the neural network can perform the color correction for the color image reproduction. Referring now to FIG. 10, there is shown a neural network which performs the color data correction procedure after the learning procedure converges. By contrast, the integrated neural network color correction processor, which incorporates the interpolation LUT method of the prior art technique for color space transformation, also performs the color data correction procedure after the learning procedure converges. The neural network in FIG. 10 that performs the color correction can be combined with the integrated neural network color processor of FIG. 11, so as to constitute a color processor configuration shown in FIG. 12.

Referring back to the algorithm of FIG. 13, after. After color data correction procedure performed by the neural network of either FIG. 10, 11 or 12 in step 86 is completed, the process advances to step 87, where a decision concerning whether or not the printed color reproduction of the original color patterns are satisfactory by human eyes. If satisfactory, the process terminates at step 89. If the reproduction is not acceptable by human judgement, the process can return to step 88 for the reset of the self-test pattern color data parameters in order to adjust again the learning sample for the neural network, so that a new set of color data correction scheme can be tested to produce a new set of image reproductions. Note, however, that the adjustment now for the parameter values $L_{th}$, $a_{th}$, and $b_{th}$ are the setting of smaller initial values. The reduction of the values can be, for example, 0.25 respectively for $L_{th}$, $a_{th}$, and $b_{th}$. If, however, the renewed learning process performed by the neural network does not converge as the decision-making step 85 determines, the last reproduced image patterns in step 86 and judged by the human eyes in step 87 should have been the optimized color image reproduction. The color correction procedure should then be terminated as a result of this learning procedure divergence.

What also deserves mentioning are the hardware equipments employed in testing of two sets of color images. In the first set, the color scanning input device was a UC300 color scanner, and the color printing output device was a Canon BJC 820 color printer, with the learning error achieved by the neural network of the present invention going down to 2%. In the second set the color scanning input device was a CLC 300 color scanner, and the color printing output device was a Fargo Primera thermal dye-transferring color printer, with the learning error achieved by the neural network of the present invention reaching down to 1.5%.

The characteristics extracting functionalization method of the present invention results in higher rates of successful learning procedure convergence than that of the prior art, such as can be achieved by the apparatus disclosed by the U.S. Pat. No. 5,162,899 listed herein for reference. The functionalization method of the present invention is capable of solving color space mismatch among the input and output color spaces simply by non-complicated computation procedures. On the other hand, the improved back-propagation algorithm of the present invention can obtain more uniform color space signals that promotes the quality of the reproduced color images, as compared to the achievements of the prior art techniques. Moreover, the multi-layer neural network structural configuration is easily applicable to the neural network for color correction required for color image reproduction. The enhanced grey-scale balancing, on the other hand, is useful for achieving satisfactory correction in the grey scale component of the image being reproduced. And, the integrated neural network color data processor can directly combine the conventional color reproduction hardware configurations without the assistance of the complicated look-up table interpolation. Most important of all, the method and apparatus of the present invention is readily applicable to the arbitrary combination of color image scanning input and printing output devices while achieving color image reproduction of high level of resemblance. The color error, as a comparison of the resemblance the present invention can achieve, is well below $E_{ab}=5$. This result was obtained by calculating 540 test patterns with consideration of the effect of gamut mismatch.

While the description of the present invention had utilized several specified conditions in the description of certain preferred embodiments, those conditions, however, are only for the purpose of exemplifying the invention, not to limit the scope of the invention which is defined in the claims section that follows.

I claim:

1. A method for adaptive color scanning/printing data correction, wherein a color scanning/printing system includes a color image inputting device, a neural network, and a color image outputting device, said inputting device being connected to said neural network, and said neural network being connected to said outputting device, said method comprising the steps of:

providing pre-selected test color image patterns to said color image outputting device for outputting a first output image;

inputting said first output image to said inputting device to obtain color data of said first output image, and processing a learning sample generated with said color data by said neural network;

said neural network subsequently taking the average of the data values of all the color picture elements within a neighborhood in the predetermined vicinity of each input color picture element, and taking the average data value of all the color picture elements within the corresponding neighborhood of the corresponding output color picture element, so as to constitute a learning sample pair including the averaged color data values of input and output gamuts respectively; and said neural network processing said generated learning sample pair to perform a neural network learning procedure.

2. The method of claim 1 for adaptive color scanning/printing data correction, wherein said neural network performs a back-propagation balancing algorithm for a learning procedure until the learning error reaches below a predetermined value, wherein said back-propagation algorithm is defined:

for output layer k of said neural network, $$\Delta W_{kj} = \eta \cdot \delta_k \cdot O_j$$
$$\delta_k = (t_k - O_k)(1 + O_k)(1 - O_k)$$

and for the inner layer j, $$\Delta W_{ji} = \eta \cdot \delta_j \cdot O_i$$

$$\delta_j = \left( \sum_k \delta_k W_{kj} \right)(1 - O_j) \cdot O_j \cdot h_p$$

wherein $O_i$, $O_j$, and $O_k$ are the outputs of the neural elements in the i, j and k layers of said neural network respectively, $t_k$ is the target value of the output layer neural element of said neural network, $h_p$ is the hidden layer acceleration parameter, $W_{kj}$ and $W_{ji}$ are the neural weight values between the k and j layers and between the j and i layers of said neural network respectively, and $\eta$ is the learning rate parameter.

3. The method of claim 2 for adaptive color scanning/printing data correction, wherein said learning sample at the time when the learning error reaches below said first predetermined value is extracted with its grey content to constitute a neutral learning sample for feeding back to said neural network for a re-started learning procedure until the learning error reaches again below a second predetermined value.

4. The method of claim 2 for adaptive color scanning/printing data correction, further comprising the step of utilizing said neural network to perform color space transformation.

5. The method of claim 3 for adaptive color scanning/printing data correction, further comprising the step of utilizing said neural network to perform color space transformation.

6. The method of claim 2 for adaptive color scanning/printing data correction, wherein the inner layer acceleration parameter of said back-propagation algorithm ($h_p$) is in the range of 1.5 to 8, and the learning rate parameter ($\eta$) is in the range of 0.0005 to 0.02.

7. The method of claim 1 for adaptive color scanning/printing data correction, wherein said learning sample at the time when the learning error reaches below a first predetermined value is extracted with its grey content to constitute a neutral learning sample for feeding back to said neural network for a re-started learning procedure until the learning error reaches again below a second predetermined value.

8. The method of claim 7 for adaptive color scanning/printing data correction, further comprising the step of utilizing said neural network to perform color space transformation.

9. The method of claim 1 for adaptive color scanning/printing data correction, further comprising the step of utilizing said neural network to perform color space transformation.

10. The method of claim 1 for adaptive color scanning/printing data correction, wherein said characteristics extracting neural network constrains each picture element neighborhood for learning sample parameters in three-dimensional color space having a range above 0.5 ($L_{th}$), 1($a_{th}$), and 1($b_{th}$) and below 5($L_{th}$), 7($a_{th}$), and 7($b_{th}$).

11. The method of claim 1 for adaptive color scanning/printing data correction, wherein said neural network is a multi-layered network comprising 4 to 8 layers and each layer having 20 to 100 neural elements.

12. A method for adaptive color scanning/printing data correction by neural network back-propagation algorithm, wherein a color scanning/printing system includes a color image inputting device, a neural network, and a color image outputting device, said inputting device being connected to said neural network, and said neural network being connected to said outputting device, said method comprising the steps of:

(a) providing pre-selected test color image patterns to said color image outputting device for outputting a first output image;

(b) inputting said first output image to said inputting device to obtain color data of said first output image, and processing a learning sample generated with said color data by said neural network;

(c) said neural network performing a back-propagation balancing algorithm for a learning procedure until the learning error reaches below a predetermined value, wherein said back-propagation algorithm is defined:

for output layer k of said neural network, $$\Delta W_{kj} = \eta \delta_k \cdot O_j$$
$$\delta_k = (t_k - O_k)(1 + O_k)(1 - O_k)$$

and for the hidden layer j, $$\Delta W_{ji} = \eta \cdot \delta_j \cdot O_i$$
$$\delta_j = \left( \sum_k \delta_k W_{kj} \right)(1 - O_j) \cdot O_j \cdot h_p$$

wherein $O_i$, $O_j$, and $O_k$ are the outputs of the neural elements in the i, j and k layers of said neural network respectively, $t_k$ is the target value of the output layer neural element of said neural network, $h_p$ is the hidden layer acceleration parameter, $W_{kj}$ and $W_{ji}$ are the neural weight values between the k and j layers and between the j and i layers of said neural network respectively, and n is the learning rate parameter.

13. The method of claim 12 for adaptive color scanning/printing data correction, wherein said learning sample at the time when the learning error reaches below a first predetermined value is extracted with its grey content to constitute a neutral learning sample for feeding back to said neural network for a re-started learning procedure until the learning error reaches again below a second predetermined value.

14. The method of claim 13 for adaptive color scanning/printing data correction, further comprising the step of utilizing said neural network to perform color space transformation.

15. The method of claim 12 for adaptive color scanning/printing data correction, further comprising the step of utilizing said neural network to perform color space transformation.

16. A method for adaptive color scanning/printing data correction, wherein a color scanning/printing system includes a color image inputting device, a neural network, and a color image outputting device, said inputting device being connected to said neural network, and said neural network being connected to said outputting device, said method comprising the steps of:

providing pre-selected test color image patterns to said color image outputting device for outputting a first output image;

inputting said first output image to said inputting device to obtain color data of said first output image, and processing a learning sample generated with said color data by said neural network;

said neural network processing said constituted learning sample, and at the time when the learning error reaches below a first predetermined value, said learning sample being extracted with its grey content to constitute a neutral learning sample for feeding back to said neural network for a re-started learning procedure until the learning error reaches again below a second predetermined value.

17. A neural network color data correction apparatus for adaptive color scanning/printing, wherein a color scanning/printing system includes a color image inputting device, a neural network, and a color image outputting device, said inputting device being connected to said neural network, and said neural network being connected to said outputting device, said neural network color data correction apparatus comprising:

means for providing pre-selected test color image patterns to said color image outputting device for outputting a first output image;

means for inputting said first output image to said inputting device to obtain color data of said first output image, and processing a learning sample generated with said color data by said neural network means for said neural network to subsequently take the average of the data values of all the color picture elements within a neighborhood in the predetermined vicinity of each input color picture element, and take the average data value of all the color picture elements within the corresponding neighborhood of the corresponding output color picture element, so as to constitute a learning sample pair including the averaged color data values of input and output gamuts respectively; and means for said neural network to process said learning sample pair to perform a neural network learning procedure.

* * * * *